(12) United States Patent
Kusano et al.

(10) Patent No.: US 12,135,087 B2
(45) Date of Patent: Nov. 5, 2024

(54) OIL DEFLECTOR AND TURBOCHARGER

(71) Applicant: IHI Corporation, Tokyo (JP)

(72) Inventors: Satoshi Kusano, Tokyo (JP); Shinichi Kaneda, Tokyo (JP); Tetsuya Aono, Tokyo (JP)

(73) Assignee: IHI Corporation, Tokyo (JP)

( * ) Notice: Subject to any disclaimer, the term of this patent is extended or adjusted under 35 U.S.C. 154(b) by 58 days.

(21) Appl. No.: 18/057,403

(22) Filed: Nov. 21, 2022

(65) Prior Publication Data

US 2023/0088762 A1    Mar. 23, 2023

Related U.S. Application Data

(63) Continuation of application No. PCT/JP2021/019627, filed on May 24, 2021.

(30) Foreign Application Priority Data

Sep. 2, 2020   (JP) .................................. 2020-147394

(51) Int. Cl.
*F16J 15/16*      (2006.01)
*F01D 25/16*     (2006.01)
*F01D 25/18*     (2006.01)

(52) U.S. Cl.
CPC ............ *F16J 15/162* (2013.01); *F01D 25/18* (2013.01); *F01D 25/16* (2013.01)

(58) Field of Classification Search
CPC .... F16J 15/00; F16J 15/16; F16J 15/50; F16J 15/52; F16J 15/162; F16J 15/324; F16J 15/3404; F16J 15/40; F01D 25/00; F01D 25/16; F01D 25/162; F01D 25/164; F01D 25/166; F01D 25/168; F01D 25/18; F01D 25/183; F01D 25/186
USPC ......................................................... 277/549
See application file for complete search history.

(56) References Cited

U.S. PATENT DOCUMENTS

| 4,664,605 A * | 5/1987 | Asano ................... F04D 29/106 417/407 |
| 2002/0158418 A1* | 10/2002 | Thiesemann ........... F01D 25/18 277/423 |
| 2014/0127012 A1* | 5/2014 | Maniar ..................... F02C 6/12 415/230 |
| 2017/0276233 A1* | 9/2017 | Nishioka ................. F16C 17/04 |
| 2018/0058260 A1* | 3/2018 | Cottet ..................... F01D 25/18 |

(Continued)

FOREIGN PATENT DOCUMENTS

| JP | 61-11424 A | 1/1986 |
| JP | 61-107935 U | 7/1986 |

(Continued)

OTHER PUBLICATIONS

International Search Report issued Jul. 20, 2021 in PCT/JP2021/019627 filed May 24, 2021, 4 pages (with English Translation).

*Primary Examiner* — Nathan Cumar
(74) *Attorney, Agent, or Firm* — Oblon, McClelland, Maier & Neustadt, L.L.P.

(57) ABSTRACT

An oil deflector comprising: a cylindrical portion; a first guide surface extending radially outward from the cylindrical portion; and a second guide surface that is located on a radially outer side of the cylindrical portion and extends in a direction that crosses an outer peripheral surface of the cylindrical portion and the first guide surface.

17 Claims, 8 Drawing Sheets

(56) References Cited

U.S. PATENT DOCUMENTS

2019/0078732 A1* 3/2019 Kojima .................. F16N 29/02
2019/0178105 A1* 6/2019 Race ........................ F02C 6/12

FOREIGN PATENT DOCUMENTS

| JP | 6-317171 A | 11/1994 |
| JP | 5807436 B2 | 11/2015 |
| JP | WO2016/098230 A1 | 6/2016 |
| JP | WO2017/149671 A1 | 9/2017 |
| WO | WO 2019/180428 A1 | 9/2019 |

* cited by examiner

OIL DEFLECTOR AND TURBOCHARGER

CROSS REFERENCE TO RELATED APPLICATIONS

This application is a continuation application of International Application No. PCT/JP2021/019627, filed on May 24, 2021, which claims priority to Japanese Patent Application No. 2020-147394, filed on Sep. 2, 2020, the entire contents of which are incorporated by reference herein.

BACKGROUND ART

Technical Field

The present disclosure relates to an oil deflector and a turbocharger. This application claims the benefit of priority to Japanese Patent Application No. 2020-147394 filed on Sep. 2, 2020, and contents thereof are incorporated herein.

Related Art

In various devices, a bearing that axially supports a shaft has been used. For example, in Patent Literature 1, there is disclosed a turbocharger including a bearing that axially supports a shaft. Lubricating oil is supplied to a bearing used for a turbocharger or other devices.

CITATION LIST

Patent Literature

Patent Literature 1: Japanese Patent No. 5807436 B2

SUMMARY

Technical Problem

The lubricating oil supplied to an inside of the bearing is scattered from thrust bearing surfaces of the bearing along with rotation of the shaft. The lubricating oil scattered from the bearing is discharged from an oil discharge port of a housing in which the bearing is provided. When oil discharge efficiency for the lubricating oil is lowered, oil sealing performance (specifically, sealing performance at a sealed portion against the lubricating oil inside the device) degrades. Accordingly, it is desired to improve the oil discharge efficiency for the lubricating oil.

An object of the present disclosure is to provide an oil deflector and a turbocharger that are capable of improving oil discharge efficiency.

Solution to Problem

In order to solve the above-mentioned problem, according to the present disclosure, there is provided an oil deflector, including: a cylindrical portion; a first guide surface extending radially outward from the cylindrical portion; and a second guide surface that is located on a radially outer side of the cylindrical portion and extend in a direction that crosses an outer peripheral surface of the cylindrical portion and the first guide surface.

At one end of the cylindrical portion, an inclined surface being inclined to a side opposite to the first guide surface as extending toward the radially outer side may be provided, and the first guide surface and the inclined surface may be connected to each other through intermediation of the second guide surface.

The second guide surface may extend substantially in parallel to an axial direction of the cylindrical portion.

The second guide surface may extend substantially in parallel to a radial direction of the cylindrical portion.

The second guide surface may be inclined with respect to at least one of the axial direction or the radial direction of the cylindrical portion.

Two second guide surfaces may be located at different positions in a circumferential direction of the cylindrical portion.

In order to solve the above-mentioned problem, according to the present disclosure, there is provided a turbocharger including the above-mentioned oil deflector.

Effects of Disclosure

According to the present disclosure, it is possible to improve oil discharge efficiency.

DESCRIPTION OF EMBODIMENTS

Figure 1:
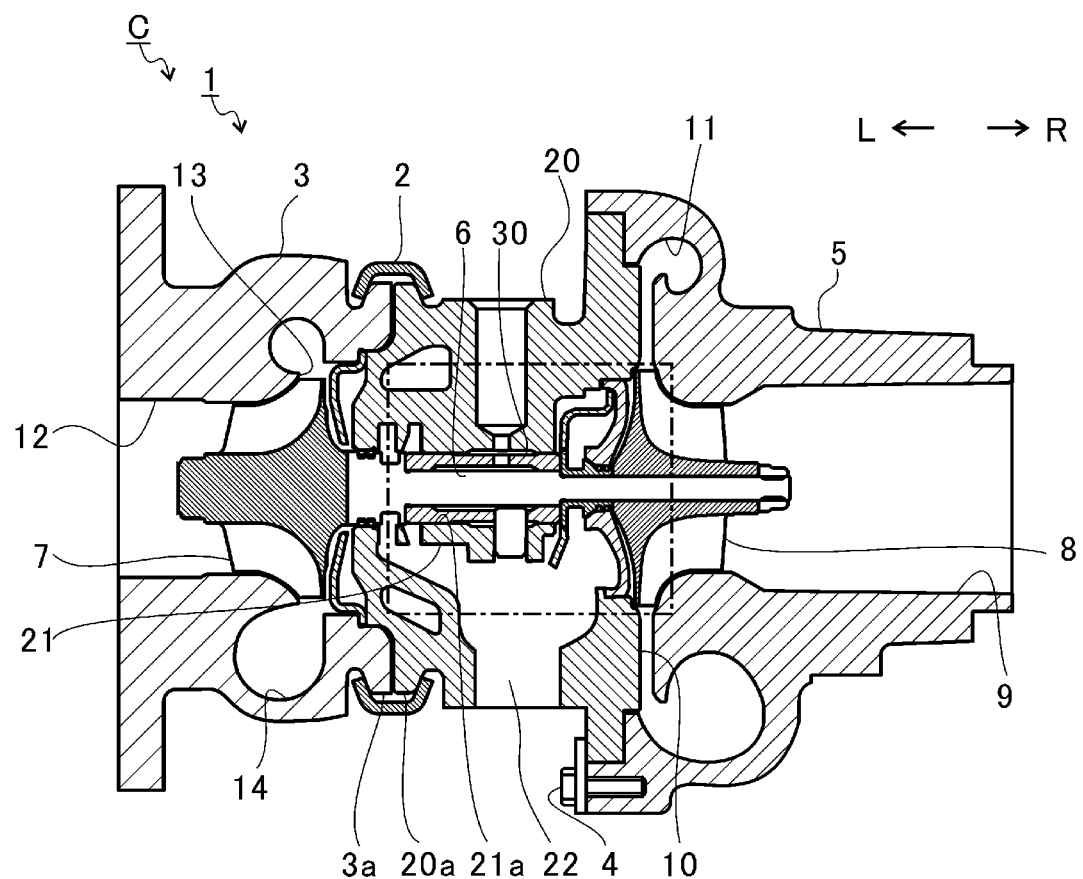
FIG. 1 is a schematic sectional view for illustrating a turbocharger according to this embodiment.

Now, with reference to the attached drawings, one embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view for illustrating a turbocharger C according to this embodiment. In the following, description is given while a direction indicated by the arrow L illustrated in FIG. 1 corresponds to a left side of the turbocharger C. A direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 20. A turbine housing 3 is coupled to a left side of the bearing housing 20 by a fastening mechanism 2. A compressor housing 5 is coupled to a right side of the bearing housing 20 by fastening bolts 4. The bearing housing 20, the turbine housing 3, and the compressor housing 5 are integrated with each other.

A protrusion 20a is formed on an outer peripheral surface of the bearing housing 20. The protrusion 20a is formed near the turbine housing 3. The protrusion 20a protrudes in a radial direction of the bearing housing 20. A protrusion 3a is formed on an outer peripheral surface of the turbine housing 3. The protrusion 3a is formed near the bearing housing 20. The protrusion 3a protrudes in a radial direction of the turbine housing 3. The bearing housing 20 and the turbine housing 3 are mounted to each other by band-fastening the protrusions 20a and 3a via the fastening mechanism 2. The fastening mechanism 2 is, for example, a G coupling for holding the protrusions 20a and 3a.

The bearing housing 20 includes a bearing wall portion 21. The bearing wall portion 21 has a bearing hole 21a. The bearing hole 21a passes through the bearing wall portion 21 in a right-and-left direction of the turbocharger C. A bearing 30 is provided in the bearing hole 21a. In FIG. 1, a semi-floating bearing is illustrated as an example of the bearing 30. However, any other bearing having at least thrust bearing surfaces may be used as the bearing 30. A shaft 6 is axially supported by the bearing 30 so as to be rotatable. A turbine wheel 7 is mounted to a left end portion of the shaft 6. The turbine wheel 7 is accommodated in the turbine housing 3 so as to be rotatable. A compressor impeller 8 is mounted to a right end portion of the shaft 6. The compressor impeller 8 is accommodated in the compressor housing 5 so as to be rotatable. A lower part of the bearing housing 20 has a discharge port 22 for discharging lubricating oil scattered from the bearing 30.

An intake port 9 is formed in the compressor housing 5. The intake port 9 is opened on the right side of the turbocharger C. The intake port 9 is connected to an air cleaner (not shown). A diffuser flow passage 10 is defined by the opposed surfaces of the bearing housing 20 and the compressor housing 5. The diffuser flow passage 10 has an annular shape extending from a radially inner side toward a radially outer side of the shaft 6. The diffuser flow passage 10 communicates with the intake port 9 on the above-mentioned radially inner side through intermediation of the compressor impeller 8.

A compressor scroll flow passage 11 is provided in the compressor housing 5. The compressor scroll flow passage 11 has an annular shape. The compressor scroll flow passage 11 is located, for example, on an outer side with respect to the diffuser flow passage 10 in a radial direction of the shaft 6. The compressor scroll flow passage 11 communicates with an intake port of an engine (not shown). The compressor scroll flow passage 11 also communicates with the diffuser flow passage 10.

When the compressor impeller 8 rotates, the air is sucked from the intake port 9 into the compressor housing 5. The sucked air is pressurized and accelerated in the course of flowing through blades of the compressor impeller 8. The air having been pressurized and accelerated is increased in pressure in the diffuser flow passage 10 and the compressor scroll flow passage 11. The air having been increased in pressure is led to the intake port of the engine.

A discharge port 12 is formed in the turbine housing 3. The discharge port 12 is opened on the left side of the turbocharger C. The discharge port 12 is connected to an exhaust gas purification device (not shown). A flow passage 13 and a turbine scroll flow passage 14 are formed in the turbine housing 3. The turbine scroll flow passage 14 has an annular shape. The turbine scroll flow passage 14 is located, for example, on an outer side with respect to the flow passage 13 in a radial direction of the turbine wheel 7. The turbine scroll flow passage 14 communicates with a gas inflow port (not shown). Exhaust gas discharged from an exhaust manifold of the engine (not shown) is led to the gas inflow port. The turbine scroll flow passage 14 also communicates with the turbine wheel 7 through intermediation of the above-mentioned flow passage 13.

The exhaust gas having been led from the gas inflow port to the turbine scroll flow passage 14 is led to the discharge port 12 through intermediation of the flow passage 13 and the turbine wheel 7. The exhaust gas led to the discharge port 12 rotates the turbine wheel 7 in the course of flowing. A rotational force of the turbine wheel 7 is transmitted to the compressor impeller 8 through the shaft 6. As described above, air is increased in pressure by a rotational force of the compressor impeller 8, and is led to the intake port of the engine.

Figure 2:
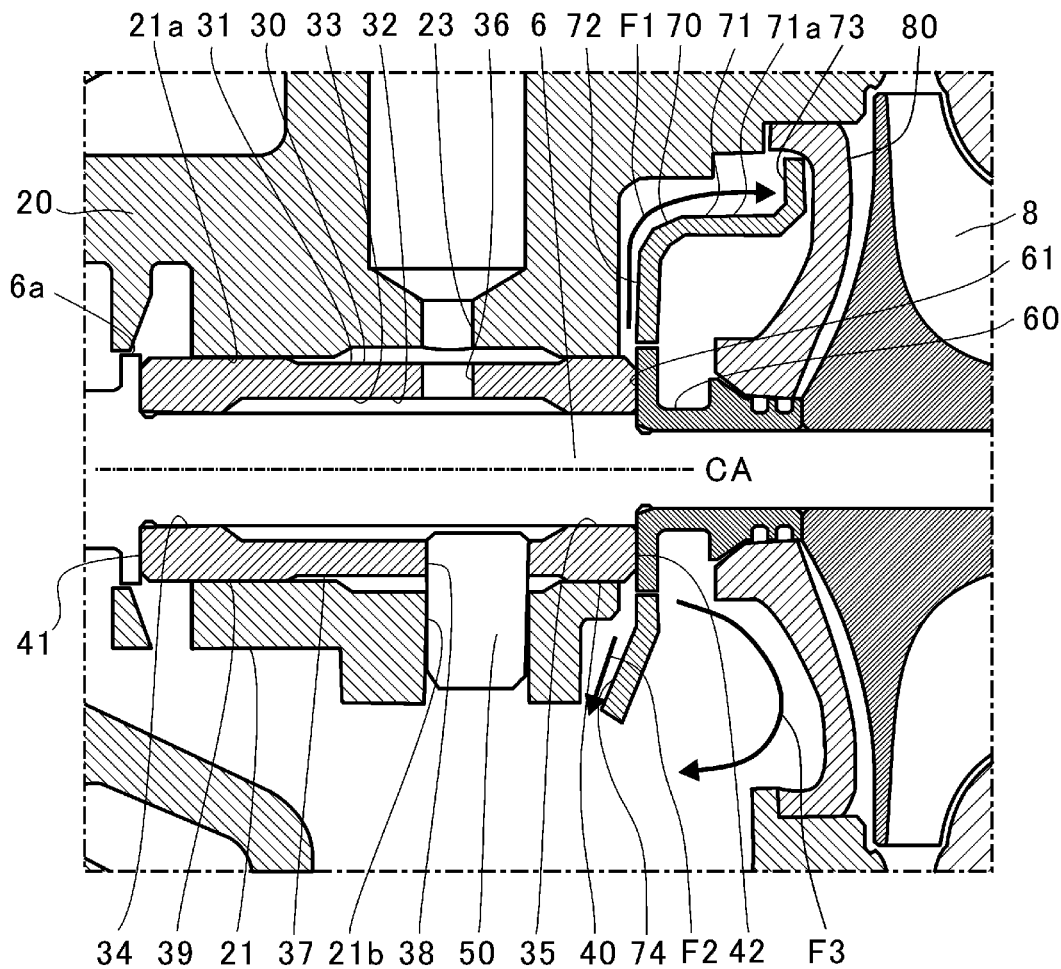
FIG. 2 is an extracted view for illustrating a portion surrounded by a one-dot chain line of FIG. 1.

FIG. 2 is an extracted view for illustrating a portion surrounded by a one-dot chain line of FIG. 1. As illustrated in FIG. 2, the bearing housing 20 has an oil passage 23. The oil passage 23 passes from an outside of the bearing housing 20 to the bearing hole 21a. The lubricating oil flows from the oil passage 23 into the bearing hole 21a. A main body portion 31 of the bearing 30 has an insertion hole 32. The insertion hole 32 passes through the main body portion 31 in an axial direction of the shaft 6 (hereinafter referred to simply as "axial direction"). A center axis CA of the bearing 30 extends in the right-and-left direction. The shaft 6 is inserted into the insertion hole 32. An inner peripheral surface 33 of the insertion hole 32 includes two radial bearing surfaces 34 and 35. The radial bearing surfaces 34 and 35 are apart from each other in the axial direction.

The main body portion 31 of the bearing 30 has an oil hole 36. The oil hole 36 passes through the main body portion 31 from the inner peripheral surface 33 to an outer peripheral surface 37. A part of the lubricating oil supplied into the bearing hole 21a passes through the oil hole 36, and flows onto the inner peripheral surface 33 of the main body portion 31. The lubricating oil flowing onto the inner peripheral surface 33 spreads from the oil hole 36 in the right-and-left direction in FIG. 2. The spreading lubricating oil is supplied to clearance defined by the shaft 6 and the radial bearing surfaces 34 and 35. The shaft 6 is axially borne by oil film pressure of the lubricating oil supplied to the clearance defined by the shaft 6 and the radial bearing surfaces 34 and 35.

The main body portion 31 of the bearing 30 has a through hole 38. The through hole 38 passes through the main body portion 31 from the inner peripheral surface 33 to the outer peripheral surface 37. The bearing wall portion 21 has a pin hole 21b. The pin hole 21b is formed at a position opposed to the through hole 38. The pin hole 21b passes through a wall portion that defines the bearing hole 21a. A positioning pin 50 is fitted into the pin hole 21b from below in FIG. 2. A distal end of the positioning pin 50 is inserted into the through hole 38 of the bearing 30. Rotation of the bearing 30 and movement of the bearing 30 in the axial direction are restricted by the positioning pin 50.

An oil thrower member 60 is mounted onto the shaft 6. The oil thrower member 60 is arranged on a right side (compressor impeller 8 side) with respect to the main body portion 31 in FIG. 2. The oil thrower member 60 is an annular member. The oil thrower member 60 causes the lubricating oil, which flows along the shaft 6 to the compressor impeller 8 side, to be scattered to a radially outer side. The oil thrower member 60 prevents leakage of the lubricating oil to the compressor impeller 8 side. An opposed surface 61, which is a left end surface of the oil thrower member 60, is opposed to the main body portion 31 in the axial direction.

The shaft 6 has a large-diameter portion 6a. The large-diameter portion 6a is located on a left side (turbine wheel 7 side) with respect to the main body portion 31 in FIG. 2. The large-diameter portion 6a is opposed to the main body portion 31 in the axial direction.

As described above, the movement of the main body portion 31 of the bearing 30 in the axial direction is restricted by the positioning pin 50. The main body portion 31 is sandwiched between the oil thrower member 60 and the large-diameter portion 6a in the axial direction. The lubricating oil is supplied to a clearance defined by the main body portion 31 and the oil thrower member 60 and a clearance defined by the main body portion 31 and the large-diameter portion 6a. When the shaft 6 moves in the axial direction, the oil thrower member 60 or the large-diameter portion 6a is borne by oil film pressure between the oil thrower member 60 or the large-diameter portion 6a and the main body portion 31. Both end surfaces of the main body portion 31 of the bearing 30 in the axial direction serve as thrust bearing surfaces 41 and 42. The thrust bearing surfaces 41 and 42 receive thrust loads. The thrust bearing surface 41, which is the left one of the thrust bearing surfaces 41 and 42, is opposed to the large-diameter portion 6a. The thrust bearing surface 42, which is the right one of the thrust bearing surfaces 41 and 42, is opposed to the oil thrower member 60.

Both end portions of an outer peripheral surface of the main body portion 31 in the axial direction have damper portions 39 and 40, respectively. The damper portions 39 and 40 suppress vibration of the shaft 6 with the oil film pressure of the lubricating oil supplied to a clearance defined by an inner peripheral surface of the bearing hole 21a and the damper portion 39 and a clearance defined by the inner peripheral surface of the bearing hole 21a and the damper portion 40.

An oil deflector 70 is provided on a right side of the thrust bearing surface 42 of the bearing 30. The oil deflector 70 is an annular member. The oil deflector 70 is arranged coaxially with the bearing 30. The oil deflector 70 covers an outer peripheral edge of a left end portion (specifically, a portion having the opposed surface 61) of the oil thrower member 60. The oil thrower member 60 is rotatable relative to the oil deflector 70. The oil deflector 70 is mounted to a seal plate 80. The seal plate 80 closes a space between an outer peripheral surface of the oil thrower member 60 and an inner wall surface of the bearing housing 20 so as to prevent leakage of the lubricating oil from an internal space of the bearing housing 20 into an internal space of the compressor housing 5. The lubricating oil scattered from the thrust bearing surface 42 of the bearing 30 is blocked by the oil deflector 70, and is led to the discharge port 22 (see FIG. 1) in the lower part of the bearing housing 20. As a result, the leakage of the lubricating oil to the compressor impeller 8 side is more effectively prevented.

Figure 3:
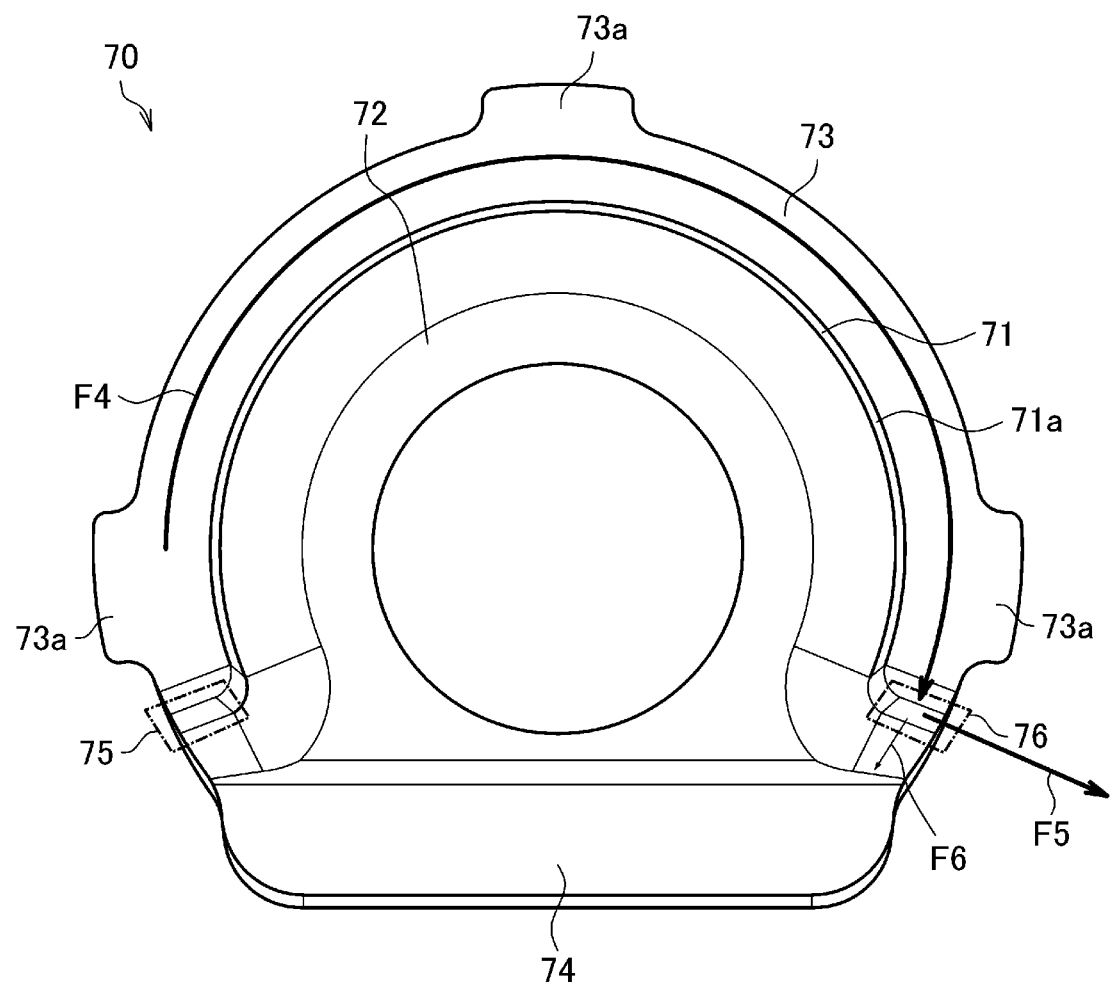
FIG. 3 is a front view for illustrating an oil deflector according to this embodiment when viewed from a bearing side.
Figure 4:
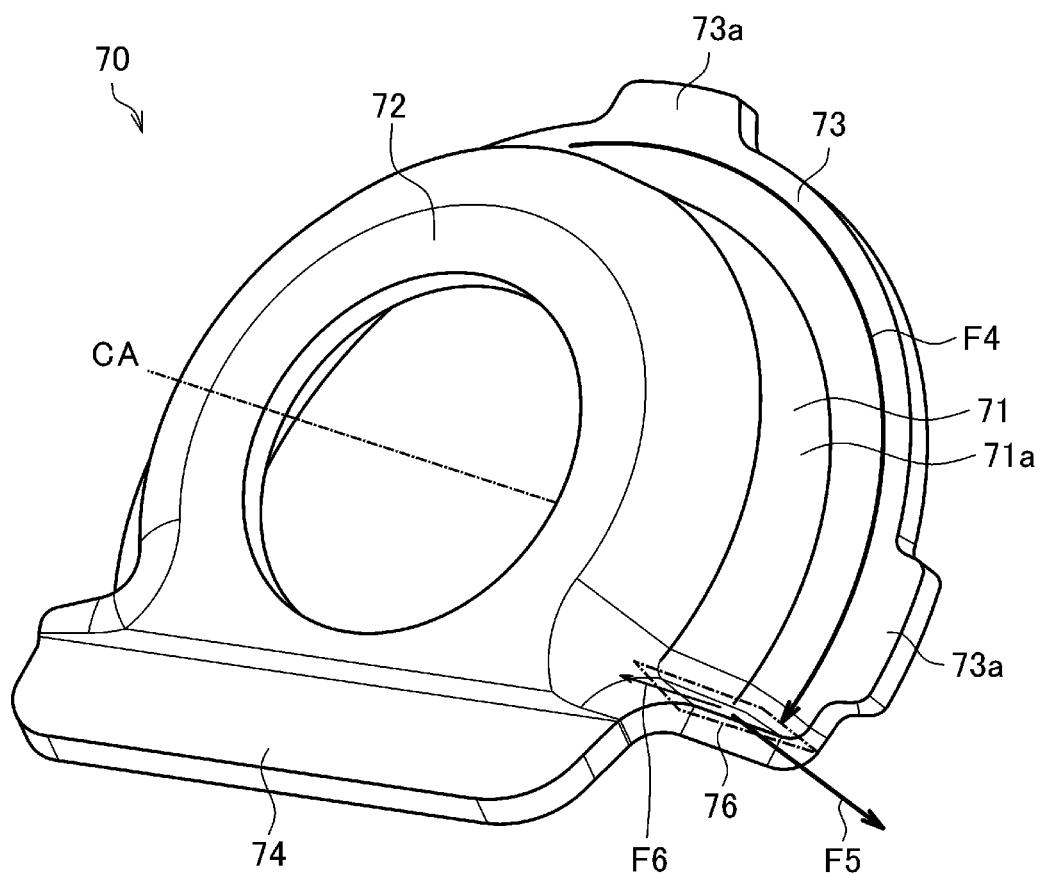
FIG. 4 is a perspective view for illustrating the oil deflector according to this embodiment when viewed from the bearing side.

Now, details of the oil deflector 70 are described with reference to FIG. 3 and FIG. 4 in addition to FIG. 2. FIG. 3 is a front view for illustrating the oil deflector 70 according to this embodiment when viewed from the bearing 30 side. FIG. 4 is a perspective view for illustrating the oil deflector 70 according to this embodiment when viewed from the bearing 30 side. In FIG. 2, FIG. 3, and FIG. 4, flows of the lubricating oil scattered from the thrust bearing surface 42 of the bearing 30 are indicated by arrows F1, F2, F3, F4, F5, and F6.

As illustrated in FIG. 2 to FIG. 4, the oil deflector 70 includes a cylindrical portion 71, a flat surface portion 72, a first guide surface 73, an inclined surface 74, and second guide surfaces 75 and 76. The oil deflector 70 is formed integrally by, for example, press working. However, the oil deflector 70 may also be formed by joining a plurality of members.

The cylindrical portion 71 is located coaxially with the bearing 30. The flat surface portion 72 extends radially inward from a left end portion of the cylindrical portion 71. The flat surface portion 72 covers the outer peripheral edge of the left end portion (specifically, the portion having the opposed surface 61) of the oil thrower member 60.

The first guide surface 73 extends radially outward from the cylindrical portion 71 (more specifically, an outer peripheral edge of a right end thereof). The first guide surface 73 extends in a circumferential direction of the cylindrical portion 71. The first guide surface 73 has claw portions 73a that protrude to the radially outer side of the cylindrical portion 71. In the example of FIG. 3, three claw portions 73a are formed at intervals in the circumferential direction of the cylindrical portion 71. The claw portions 73a are mounted to the seal plate 80 by, for example, press-fitting.

The claw portions 73a may also be mounted to the bearing housing 20 through intermediation of a member other than the seal plate 80. The claw portions 73a may be directly mounted to the bearing housing 20. Portions of the oil deflector 70 other than the claw portions 73a may be mounted to the seal plate 80, a member mounted to the bearing housing 20 other than the seal plate 80, or the bearing housing 20. In this case, the claw portions 73a may be omitted from the components of the bearing housing 20. Further, the oil deflector 70 may be formed integrally with the bearing housing 20.

The inclined surface 74 is located on one end side (more specifically, a lower part of a left end portion) of the cylindrical portion 71. The inclined surface 74 is inclined to a left side (specifically, to a side opposite to the first guide surface 73) in FIG. 2 as extending toward the radially outer side of the cylindrical portion 71.

As indicated by the arrow F1 in FIG. 2, a part of the lubricating oil scattered from the thrust bearing surface 42 of the bearing 30 is led to the first guide surface 73 along an outer surface of the cylindrical portion 71. As indicated by the arrow F4 in FIG. 3 and FIG. 4, the lubricating oil led to the first guide surface 73 is guided in the circumferential direction along the first guide surface 73. The flow of the lubricating oil along the first guide surface 73 (specifically, the flow indicated by the arrow F4) is referred to as "inner flow". A direction of the inner flow indicated by the arrow F4 matches a rotation direction of the shaft 6. Specifically, the arrow F4 indicates the inner flow when the shaft 6 rotates clockwise in FIG. 3.

As indicated by the arrow F2 in FIG. 2, a part of the lubricating oil scattered from the thrust bearing surface 42 of the bearing 30 is caused to flow downward along the inclined surface 74. The lubricating oil caused to flow downward along the inclined surface 74 is led to the discharge port 22 (see FIG. 1) in the lower part of the bearing housing 20.

In this case, as indicated by the arrow F3 in FIG. 2, a part of the lubricating oil scattered from the thrust bearing surface 42 of the bearing 30 passes through a clearance defined by the oil thrower member 60 and the cylindrical portion 71, and is discharged to the compressor impeller 8 side. The lubricating oil, which has passed through the clearance defined by the oil thrower member 60 and the cylindrical portion 71, is scattered radially outward along with the rotation of the oil thrower member 60. The flow of radially scattered lubricating oil, which has passed through the clearance defined by the oil thrower member 60 and the cylindrical portion 71 (specifically, the flow indicated by the arrow F3), is referred to as "outer flow".

The inner flow indicated by the arrow F4 in FIG. 3 and FIG. 4 and the outer flow indicated by the arrow F3 in FIG. 2 may merge in the vicinity of the lower part of the oil deflector 70 and interfere with each other. The interference between the inner flow and the outer flow may impair oil discharge efficiency for the lubricating oil and degrade oil sealing performance. The oil deflector 70 according to this embodiment includes the second guide surfaces 75 and 76 to thereby prevent the interference between the inner flow and the outer flow.

As illustrated in FIG. 3 and FIG. 4, the second guide surfaces 75 and 76 are located on the radially outer side of the cylindrical portion 71. The second guide surfaces 75 and 76 extend in a direction that crosses the outer peripheral surface 71a of the cylindrical portion 71 and the first guide surface 73. The second guide surfaces 75 and 76 are connected to the outer peripheral surface 71a of the cylindrical portion 71 and the first guide surface 73.

The second guide surfaces 75 and 76 extend between the first guide surface 73 and the inclined surface 74. Specifically, the first guide surface 73 and the inclined surface 74 are connected to each other through intermediation of the second guide surfaces 75 and 76. The second guide surface 75 extends between the first guide surface 73 and a left end portion of the inclined surface 74 in FIG. 3. The second guide surface 76 extends between the first guide surface 73 and a right end portion of the inclined surface 74 in FIG. 3. As described above, the two second guide surfaces 75 and 76 are formed at different positions in the circumferential direction of the cylindrical portion 71. The two second guide surfaces 75 and 76 are arranged at bilaterally symmetric positions (specifically, positions symmetric with respect to a vertical axis) in FIG. 3, but may also be arranged at bilaterally asymmetric positions in FIG. 3. Further, one of the two second guide surfaces 75 and 76 may be omitted from the components of the oil deflector 70. Specifically, the number of second guide surfaces may be one.

In this embodiment, the second guide surfaces 75 and 76 extend substantially in parallel to an axial direction of the cylindrical portion 71 and substantially in parallel to a radial direction of the cylindrical portion 71. However, the second guide surfaces 75 and 76 are slightly inclined with respect to the axial direction of the cylindrical portion 71. Each of the second guide surfaces 75 and 76 is slightly inclined so that its bearing 30 side is located below its first guide surface 73 side. Each of the second guide surfaces 75 and 76 is inclined so that its radially outer side is located below its radially inner side. The second guide surfaces 75 and 76 are located below a center position of the shaft 6. The second guide surfaces 75 and 76 may also be located above the center position of the shaft 6. In view of prevention of the interference between the inner flow and the outer flow, however, it is preferred that the second guide surfaces 75 and 76 be located below the center position of the shaft 6. The second guide surfaces 75 and 76 are located above the inclined surface 74.

As described above, the inner flow indicated by the arrow F4 is the flow of the lubricating oil along the first guide surface 73. The second guide surfaces 75 and 76 are located in a path of the inner flow and extend in a direction that crosses a flow direction of the inner flow. Thus, the inner flow of the lubricating oil collides against any one of the second guide surface 75 and the second guide surface 76. Then, the flow direction of the lubricating oil is changed. In the example of FIG. 3 and FIG. 4, the inner flow of the lubricating oil indicated by the arrow F4 collides against the second guide surface 76. When the shaft 6 rotates counterclockwise in FIG. 3, the flow direction of the inner flow is reverse to the direction indicated by the arrow F4. Accordingly, the inner flow of the lubricating oil collides against the second guide surface 75.

As indicated by the arrow F5 in FIG. 3 and FIG. 4, the lubricating oil, which has collided against the second guide surface 76, is guided by the second guide surface 76 to the radially outer side of the cylindrical portion 71, and is scattered. As a result, the lubricating oil is prevented from flowing in the direction of the inner flow and reaching the vicinity of the lower part of the oil deflector 70. Thus, the inner flow and the outer flow are prevented from merging in the vicinity of the lower part of the oil deflector 70 and interfering with each other. Accordingly, the oil discharge efficiency for the lubricating oil is improved to thereby improve the oil sealing performance.

As indicated by the arrow F6 in FIG. 3 and FIG. 4, a part of the lubricating oil, which has collided against the second guide surface 76, is also guided by the second guide surface 76 to the bearing 30 side in the axial direction of the cylindrical portion 71, and is scattered. The lubricating oil scatted by the second guide surface 76 in the axial direction of the cylindrical portion 71 is caused to flow downward along the inclined surface 74. As a result, the oil discharge efficiency is further improved. In particular, the oil deflector 70 has the first guide surface 73 and the inclined surface 74 that are connected to each other through intermediation of the second guide surface 76. Thus, the lubricating oil, which has been scattered by the second guide surface 76 in the axial direction of the cylindrical portion 71, is more likely to be led to the inclined surface 74.

The oil deflector 70 includes the two second guide surfaces 75 and 76 that are formed at different positions in the circumferential direction of the cylindrical portion 71. As a result, the inner flow of the lubricating oil collides against any one of the second guide surface 75 and the second guide surface 76 regardless of the rotation direction of the shaft 6. Thus, the inner flow and the outer flow are prevented from merging in the vicinity of the lower part of the oil deflector 70 and interfering with each other regardless of the rotation direction of the shaft 6.

In the example described above, the second guide surfaces 75 and 76 extend substantially in parallel to the axial direction of the cylindrical portion 71 and substantially in parallel to the radial direction of the cylindrical portion 71. However, the directions in which the second guide surfaces 75 and 76 extend are not limited to those described above. Now, a first modification example and a second modification example are described with reference to FIG. 5, FIG. 6, FIG. 7, and FIG. 8. In the first modification example and the second modification example, the directions in which the second guide surfaces 75 and 76 extend are different from those given in the example described above.

Figure 5:
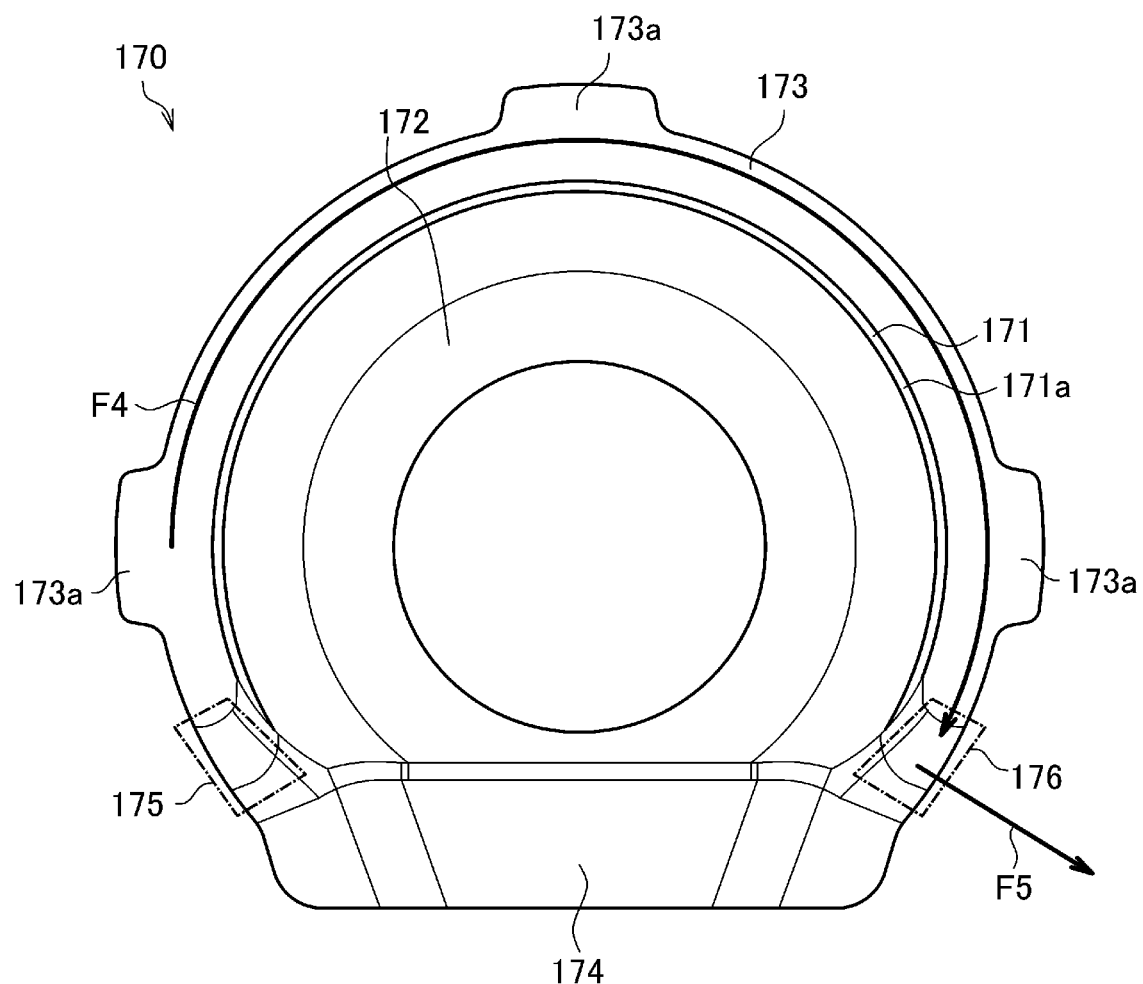
FIG. 5 is a front view for illustrating an oil deflector of a first modification example when viewed from a bearing side.
Figure 6:
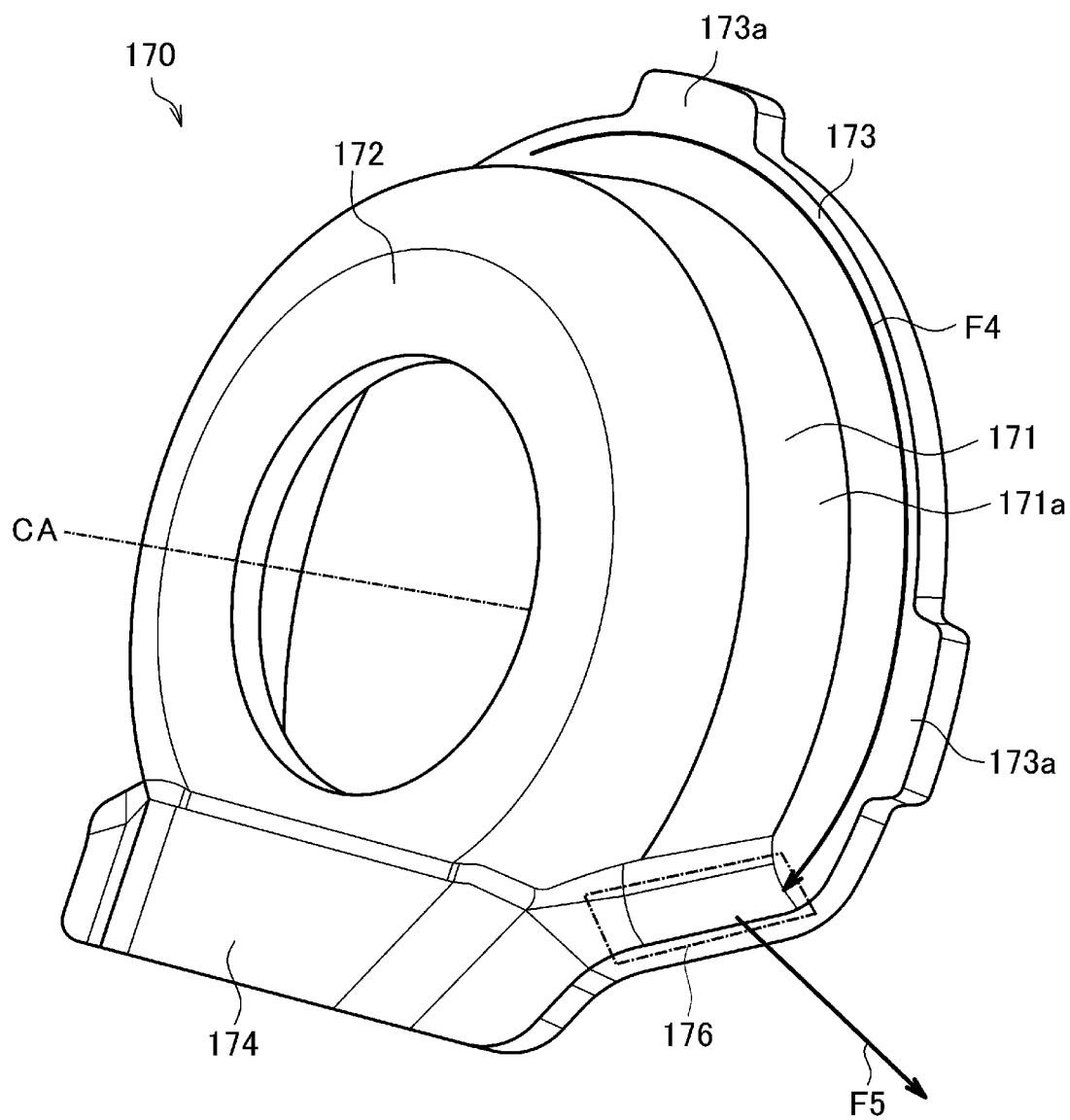
FIG. 6 is a perspective view for illustrating the oil deflector of the first modification example when viewed from the bearing side.

FIG. 5 is a front view for illustrating an oil deflector 170 of the first modification example when viewed from the bearing 30 side. FIG. 6 is a perspective view for illustrating the oil deflector 170 of the first modification example when viewed from the bearing 30 side. As illustrated in FIG. 5 and FIG. 6, the oil deflector 170 includes a cylindrical portion 171, a flat surface portion 172, a first guide surface 173, an inclined surface 174, and second guide surfaces 175 and 176. Configurations of the cylindrical portion 171, the flat surface portion 172, the first guide surface 173, and the inclined surface 174 are the same as those of the cylindrical portion 71, the flat surface portion 72, the first guide surface 73, and the inclined surface 74 of the oil deflector 70. Thus, the description thereof is herein omitted. The oil deflector 170 can be mounted to the seal plate 80 by using claw portions 173a of the first guide surface 173.

Similarly to the second guide surfaces 75 and 76 of the oil deflector 70, the second guide surfaces 175 and 176 are located on a radially outer side of the cylindrical portion 171. Further, the second guide surfaces 175 and 176 extend in a direction that crosses an outer peripheral surface 171a of the cylindrical portion 171 and the first guide surface 173. Further, the second guide surfaces 175 and 176 are connected to the outer peripheral surface 171a of the cylindrical portion 171 and the first guide surface 173. Further, each of the second guide surfaces 175 and 176 extends between the first guide surface 173 and the inclined surface 174.

In the first modification example, similarly to the second guide surfaces 75 and 76 of the oil deflector 70, the second guide surfaces 175 and 176 extend substantially in parallel to a radial direction of the cylindrical portion 171. Meanwhile, in contrast to the second guide surfaces 75 and 76 of the oil deflector 70, the second guide surfaces 175 and 176 are steeply inclined with respect to an axial direction of the cylindrical portion 171. Each of the second guide surfaces 175 and 176 is steeply inclined so that its bearing 30 side is located below its first guide surface 173 side. Each of the second guide surfaces 175 and 176 is inclined so that its radially outer side is located below its radially inner side. The second guide surfaces 175 and 176 are located below the center position of the shaft 6. Positions of end portions of the second guide surfaces 175 and 176 on the bearing 30 side in an up-and-down direction substantially match a position of an upper end portion of the inclined surface 174 in the up-and-down direction.

Similarly to the oil deflector 70, an inner flow is also generated by the first guide surface 173 as indicated by an arrow F4 of FIG. 5 and FIG. 6 in the oil deflector 170 of the first modification example. The inner flow of the lubricating oil collides against the second guide surface 176. Then, as indicated by an arrow F5 in FIG. 5 and FIG. 6, the lubricating oil, which has collided against the second guide surface 176, is guided to the radially outer side of the cylindrical portion 171 by the second guide surface 176, and is scattered. As a result, the oil discharge efficiency for the lubricating oil is improved.

As in the oil deflector 170 illustrated in FIG. and FIG. 6, the second guide surfaces 175 and 176 may be steeply inclined with respect to the axial direction of the cylindrical portion 171. In the oil deflector 70 described above, however, the second guide surfaces 75 and 76 extend substantially in parallel to the axial direction of the cylindrical portion 71. As a result, a part of the lubricating oil, which has collided against the second guide surfaces 75 and 76, is more likely to be scattered by the second guide surface 76 to the bearing 30 side in the axial direction of the cylindrical portion 71. Thus, the oil discharge efficiency is further improved.

Figure 7:
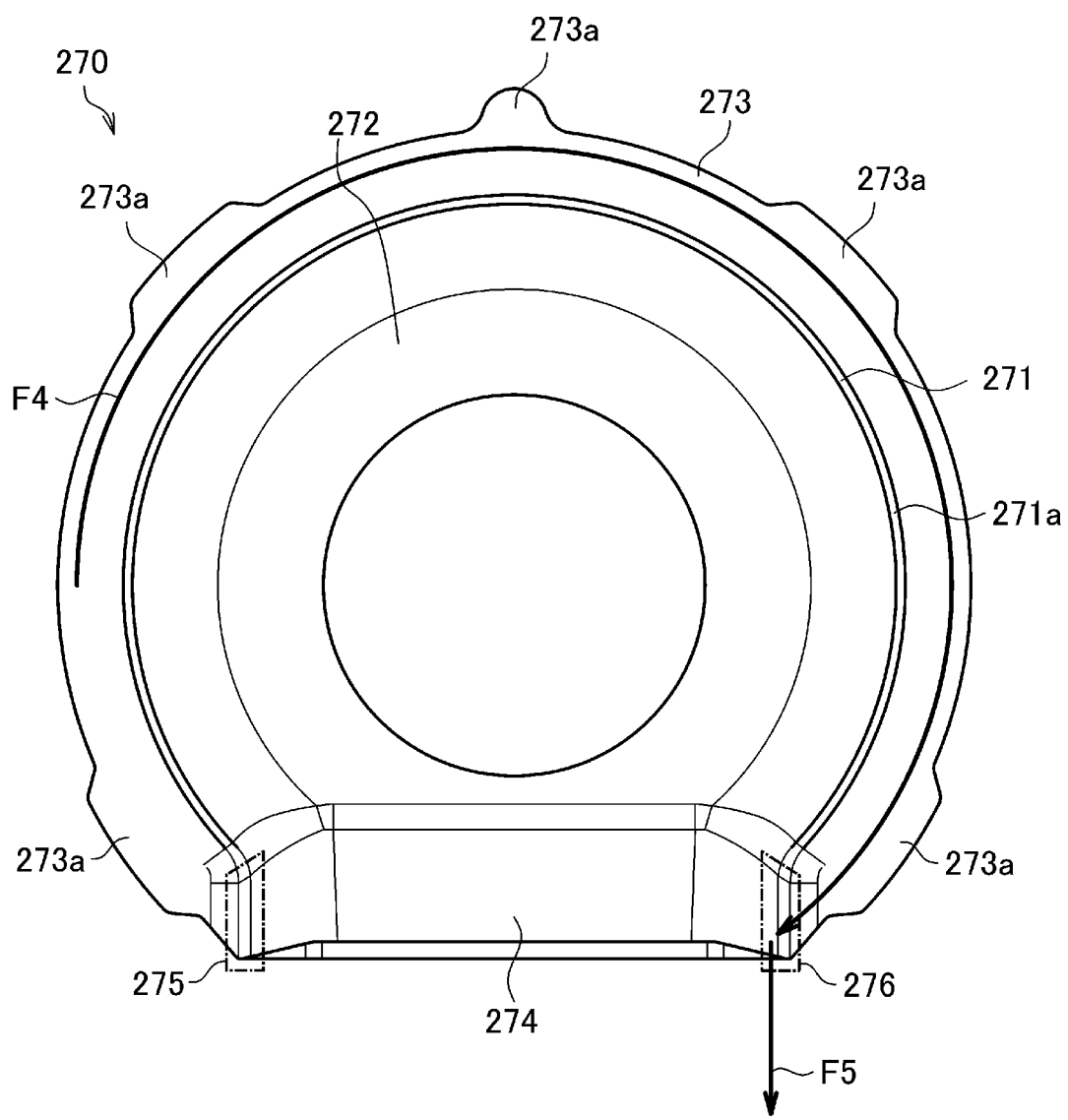
FIG. 7 is a front view for illustrating an oil deflector of a second modification example when viewed from a bearing side.
Figure 8:
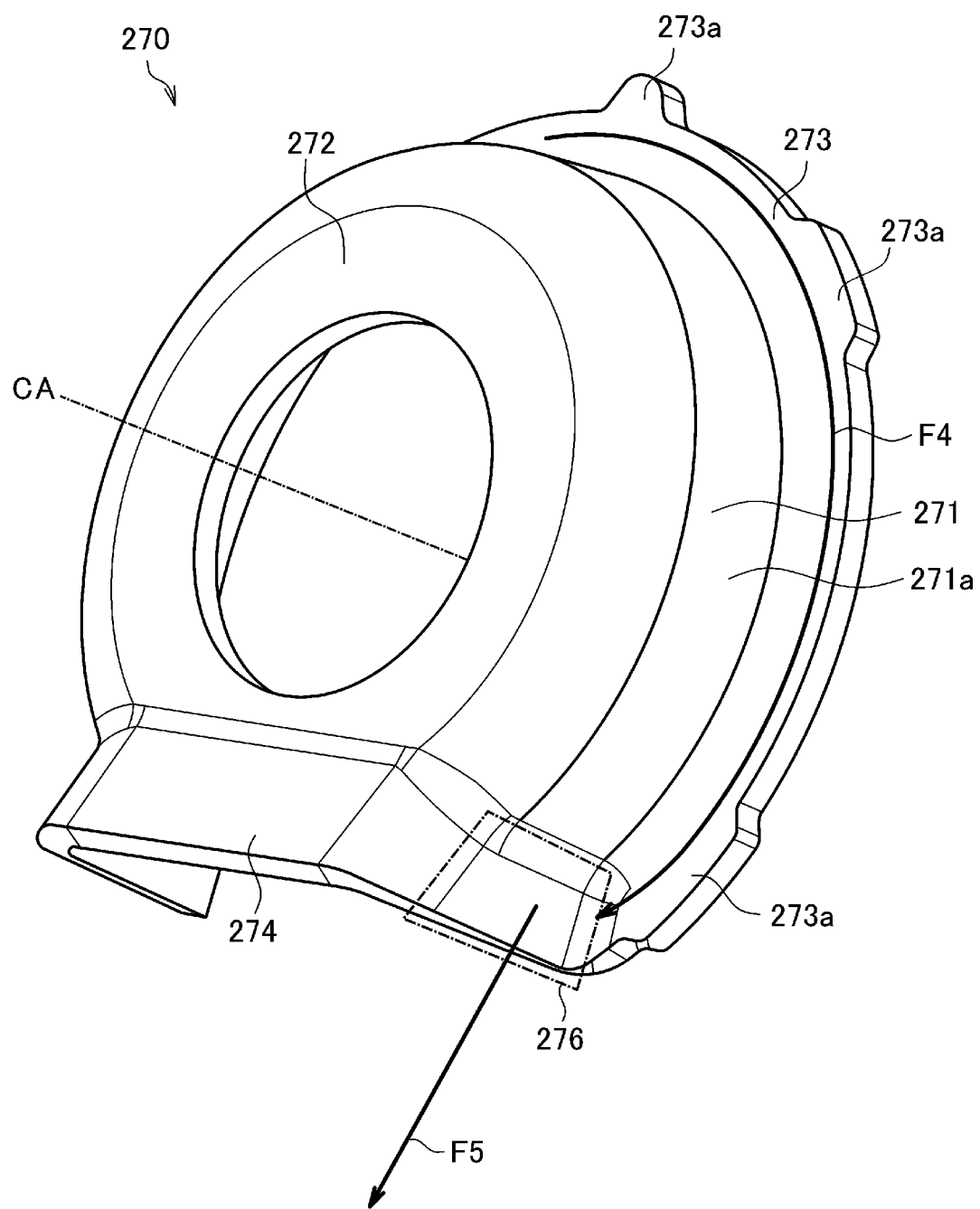
FIG. 8 is a perspective view for illustrating the oil deflector of the second modification example when viewed from the bearing side.

FIG. 7 is a front view for illustrating an oil deflector 270 of the second modification example when viewed from the bearing 30 side. FIG. 8 is a perspective view for illustrating the oil deflector 270 of the second modification example when viewed from the bearing 30 side. As illustrated in FIG. 7 and FIG. 8, the oil deflector 270 includes a cylindrical portion 271, a flat surface portion 272, a first guide surface 273, an inclined surface 274, and second guide surfaces 275 and 276. Configurations of the cylindrical portion 271, the flat surface portion 272, the first guide surface 273, and the inclined surface 274 are the same as those of the cylindrical portion 71, the flat surface portion 72, the first guide surface 73, and the inclined surface 74 of the oil deflector 70. Thus, the description thereof is herein omitted. The oil deflector 270 can be mounted to the seal plate 80 by using claw portions 273a of the first guide surface 273.

Similarly to the second guide surfaces 75 and 76 of the oil deflector 70, the second guide surfaces 275 and 276 are located on a radially outer side of the cylindrical portion 271. Further, the second guide surfaces 275 and 276 extend in a direction that crosses an outer peripheral surface 271a of the cylindrical portion 271 and the first guide surface 273. Further, the second guide surfaces 275 and 276 are connected to the outer peripheral surface 271a of the cylindrical portion 271 and the first guide surface 273. Further, each of the second guide surfaces 275 and 276 extends between the first guide surface 273 and the inclined surface 274.

In the second modification example, similarly to the second guide surfaces 75 and 76 of the oil deflector 70, the second guide surfaces 275 and 276 extend substantially in parallel to an axial direction of the cylindrical portion 271. Meanwhile, in contrast to the second guide surfaces 75 and 76 of the oil deflector 70, the second guide surfaces 275 and 276 are steeply inclined with respect to a radial direction of the cylindrical portion 271. The second guide surfaces 275 and 276 extend in an up-and-down direction. The second guide surfaces 275 and 276 extend downward from the outer peripheral surface 271a of the cylindrical portion 271. Each of the second guide surfaces 275 and 276 is inclined so that its bearing 30 side becomes closer to the center axis CA of the bearing 30 with respect to its first guide surface 73 side. The second guide surfaces 275 and 276 are located below the center position of the shaft 6. Center positions of the second guide surfaces 275 and 276 in the up-and-down direction are located below an upper end portion of the inclined surface 274 and above a lower end portion of the inclined surface 274.

Similarly to the oil deflector 70, an inner flow is also generated by the first guide surface 273 as indicated by the arrow F4 in FIG. 7 and FIG. 8 in the oil deflector 270 of the second modification example. The inner flow of the lubricating oil collides against the second guide surface 276. Then, as indicated by the arrow F5 in FIG. 7 and FIG. 8, the lubricating oil, which has collided against the second guide surface 276, is guided to a radially outer side of the cylindrical portion 271 by the second guide surface 276, and is scattered. As a result, the oil discharge efficiency for the lubricating oil is improved.

As in the oil deflector 270 illustrated in FIG. 7 and FIG. 8, the second guide surfaces 275 and 276 may be steeply inclined with respect to the radial direction of the cylindrical portion 271. In the oil deflector 70 described above, however, the second guide surfaces 75 and 76 extend substantially in parallel to the radial direction of the cylindrical portion 71. As a result, a scattering direction of the lubricating oil, which has collided against the second guide surface 76 and scattered to the radially outer side of the cylindrical portion 71, more likely to extend in the radial direction of the cylindrical portion 71. Thus, the oil discharge efficiency is further improved.

An embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

In the above-mentioned examples, the oil deflector 70, 170, 270 is mounted in the turbocharger C. However, the oil deflector 70, 170, 270 may be mounted in any device other than the turbocharger C as long as the device includes a bearing having thrust bearing surfaces.

In the above-mentioned examples, the second guide surfaces 75 and 76 are connected to the outer peripheral surface 71a of the cylindrical portion 71, the first guide surface 73, and the inclined surface 74. However, the second guide surfaces 75 and 76 may be apart from at least one of the outer peripheral surface 71a of the cylindrical portion 71, the first guide surface 73, or the inclined surface 74. Similarly, the second guide surfaces 175 and 176 may be apart from at least one of the outer peripheral surface 171a of the cylindrical portion 171, the first guide surface 173, or the inclined surface 174. Similarly, the second guide surfaces 275 and 276 may be apart from at least one of the outer peripheral surface 271a of the cylindrical portion 271, the first guide surface 273, or the inclined surface 274.

The invention claimed is:

1. An oil deflector, comprising:
   a cylindrical portion;
   a first guide surface extending radially outward from the cylindrical portion;
   a second guide surface that is located on a radially outer side of the cylindrical portion and extends in a direction that crosses an outer peripheral surface of the cylindrical portion and the first guide surface; and
   an inclined surface formed at one end of the cylindrical portion, the inclined surface being inclined to a side opposite to the first guide surface as extending toward the radially outer side,
   wherein the first guide surface and the inclined surface are connected to each other through intermediation of the second guide surface.

2. The oil deflector according to claim 1, wherein the second guide surface is inclined with respect to at least one of an axial direction or a radial direction of the cylindrical portion.

3. The oil deflector according to claim 1, wherein the second guide surface comprises two second guide surfaces, and the two second guide surfaces are located at different positions in a circumferential direction of the cylindrical portion.

4. The oil deflector according to claim 2, wherein the second guide surface comprises two second guide surfaces, and the two second guide surfaces are located at different positions in a circumferential direction of the cylindrical portion.

5. A turbocharger, comprising the oil deflector of claim 1.

6. The oil deflector according to claim 1, wherein the second guide surface extends substantially in parallel to an axial direction of the cylindrical portion.

7. The oil deflector according to claim 6, wherein the second guide surface extends substantially in parallel to a radial direction of the cylindrical portion.

8. The oil deflector according to claim 6, wherein the second guide surface comprises two second guide surfaces, and the two second guide surfaces are located at different positions in a circumferential direction of the cylindrical portion.

9. The oil deflector according to claim 7, wherein the second guide surface comprises two second guide surfaces, and the two second guide surfaces are located at different positions in a circumferential direction of the cylindrical portion.

10. The oil deflector according to claim 1, wherein the second guide surface extends substantially in parallel to a radial direction of the cylindrical portion.

11. The oil deflector according to claim 10, wherein the second guide surface comprises two second guide surfaces, and the two second guide surfaces are located at different positions in a circumferential direction of the cylindrical portion.

12. An oil deflector, comprising:
    a cylindrical portion;
    a first guide surface extending radially outward from the cylindrical portion; and
    a second guide surface that is located on a radially outer side of the cylindrical portion and extends in a direction that crosses an outer peripheral surface of the cylindrical portion and the first guide surface,
    wherein the second guide surface comprises two second guide surfaces, and the two second guide surfaces are located at different positions in a circumferential direction of the cylindrical portion.

13. The oil deflector according to claim 12, wherein the second guide surface extends substantially in parallel to an axial direction of the cylindrical portion.

14. The oil deflector according to claim 12, wherein the second guide surface extends substantially in parallel to a radial direction of the cylindrical portion.

15. The oil deflector according to claim 12, wherein the second guide surface extends substantially in parallel to an axial direction of the cylindrical portion, and
    wherein the second guide surface extends substantially in parallel to a radial direction of the cylindrical portion.

16. The oil deflector according to claim 12, wherein the second guide surface is inclined with respect to at least one of an axial direction or a radial direction of the cylindrical portion.

17. A turbocharger, comprising the oil deflector of claim 12.

* * * * *